(12) United States Patent
Kim (10) Patent No.: US 11,416,060 B2
(45) Date of Patent: Aug. 16, 2022

(54) DEVICE FOR REDUCING STANDBY POWER AND ELECTRONIC DEVICE THEREFOR

(71) Applicant: Samsung Electronics Co., Ltd., Gyeonggi-do (KR)

(72) Inventor: Jong Min Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 164 days.

(21) Appl. No.: 16/763,758

(22) PCT Filed: Nov. 14, 2018

(86) PCT No.: PCT/KR2018/013869
§ 371 (c)(1),
(2) Date: May 13, 2020

(87) PCT Pub. No.: WO2019/098661
PCT Pub. Date: May 23, 2019

(65) Prior Publication Data
US 2021/0173470 A1 Jun. 10, 2021

(30) Foreign Application Priority Data
Nov. 14, 2017 (KR) .......... 10-2017-0151587

(51) Int. Cl.
*G06F 1/26* (2006.01)
*G06F 1/32* (2019.01)
(Continued)

(52) U.S. Cl.
CPC ............ *G06F 1/3287* (2013.01); *H02J 9/005* (2013.01); *H02J 9/062* (2013.01); *H02J 9/068* (2020.01)

(58) Field of Classification Search
CPC ...... G06F 1/3287; G06F 1/3228; H02J 9/005; H02J 9/062; H02J 9/068; H02J 7/0068;
(Continued)

(56) References Cited

U.S. PATENT DOCUMENTS 6,188,584 B1  2/2001  Arai et al.
9,805,890 B2  10/2017  Doljack
(Continued)

FOREIGN PATENT DOCUMENTS

JP  2000184617  6/2000
KR  1020100129664  12/2010
(Continued)

OTHER PUBLICATIONS

PCT/ISA/210 Search Report issued on PCT/KR2018/013869, pp. 5.
PCT/ISA/237 Written Opinion issued on PCT/KR2018/013869, pp. 6.

*Primary Examiner* — Xuxing Chen
(74) *Attorney, Agent, or Firm* — The Farrell Law Firm, P.C.

(57) ABSTRACT

Disclosed are a device and a method for reducing standby power consumption in an electronic device. An electronic device includes a power supply device for supplying power for driving the electronic device; and a system device driven on the basis of the power supplied from the power supply device, wherein the power supply device can include a AC-DC converter for converting alternating current power received from an external power device into direct current power; and a connection circuit for selectively connecting the external power device and the direct current converter on the basis of an operation mode of the electronic device. Other embodiments can be possible.

15 Claims, 10 Drawing Sheets

(51) Int. Cl.
*G06F 1/3287* (2019.01)
*H02J 9/06* (2006.01)
*H02J 9/00* (2006.01)

(58) Field of Classification Search
CPC . H02J 7/02; Y02B 70/30; Y02D 10/00; Y04S 20/20; H02H 7/125; H02H 7/1252; H02M 3/158; H02M 3/1582
See application file for complete search history.

(56) References Cited

U.S. PATENT DOCUMENTS

| | | | |
|---|---|---|---|
| 2010/0306558 A1* | 12/2010 | Kang | G06F 1/3203 713/300 |
| 2013/0127400 A1 | 5/2013 | Oh et al. | |
| 2014/0015507 A1* | 1/2014 | Park | G05F 1/46 323/304 |
| 2016/0359358 A1 | 12/2016 | Jeong | |
| 2017/0149236 A1* | 5/2017 | Mallory | H02H 7/1252 |

FOREIGN PATENT DOCUMENTS

| | | |
|---|---|---|
| KR | 1020120019782 | 3/2012 |
| KR | 1020140008665 | 1/2014 |
| KR | 101411433 | 6/2014 |
| KR | 101617292 | 5/2016 |
| KR | 101640584 | 7/2016 |
| KR | 1020170068913 | 6/2017 |

\* cited by examiner

DEVICE FOR REDUCING STANDBY POWER AND ELECTRONIC DEVICE THEREFOR

PRIORITY

This application is a National Phase Entry of International Application No. PCT/KR2018/013869, which was filed on Nov. 14, 2018, and claims priority to Korean Patent Application No. 10-2017-0151587 filed in the Korean Intellectual Property Office on Nov. 14, 2017, the content of each of which is incorporated herein by reference.

TECHNICAL FIELD

Various embodiments of the disclosure relate to a device and a method for reducing standby power consumption in an electronic device.

BACKGROUND ART

With the development of information and communication technology and semiconductor technology, electronic devices provide various functions and thus are being used in an increasing range of areas.

As the use of electronic devices increases, power consumption by electronic devices is on the rise. Accordingly, methods for an electronic device to efficiently manage power may be provided. For example, an electronic device may include a mechanical switch which enables a user to manually block power supply to the electronic device.

DISCLOSURE OF INVENTION

Technical Problem

An electronic device may supply power to an internal circuit of the electronic device when a mechanical switch is activated (on) by a user. The electronic device may block supply of power to the electronic device or the internal circuit, thus reducing standby power, when the mechanical switch is deactivated (off) by the user.

However, the user of the electronic device needs to continuously check the operating state of the electronic device in order to control the mechanical switch and may have inconvenience in that the user needs to control the mechanical switch in response to a change in the operating state of the electronic device.

Various embodiments of the disclosure may provide a device and a method for reducing standby power in an electronic device.

Solution to Problem

According to various embodiments of the disclosure, an electronic device may include: a power supply device configured to supply power for driving the electronic device; and a system device configured to be driven based on the power supplied from the power supply device, wherein the power supply device may include: an AC-DC converter configured to convert AC power, supplied from an external power device, into DC power; and a connection circuit configured to selectively connect the external power device and the AC-DC converter, based on an operating mode of the electronic device.

According to various embodiments of the disclosure, an operating method of an electronic device may include: operating using power supplied from a power supply device of the electronic device; and deactivating a connection circuit configured to connect an external power device and an AC-DC converter in the power supply device when the electronic device is switched to a standby mode.

Advantageous Effects of Invention

An electronic device and an operating method thereof according to various embodiments may control power supply to a system device by adding a connection circuit (relay) to a front end of a power supply device (switched-mode power supply: SPMS), thereby reducing the standby power of the electronic device.

BEST MODE FOR CARRYING OUT THE INVENTION

Hereinafter, embodiments of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

The electronic device according to various embodiments may be one of various types of electronic devices. The electronic devices may include, for example, a portable communication device (e.g., smart phone), a computer device, or a home appliance. The electronic device according to embodiments of the disclosure is not limited to those described above.

In the following description, a standby mode may include a state in which driving of an operating system (OS) of an electronic device is terminated.

Figure 1:
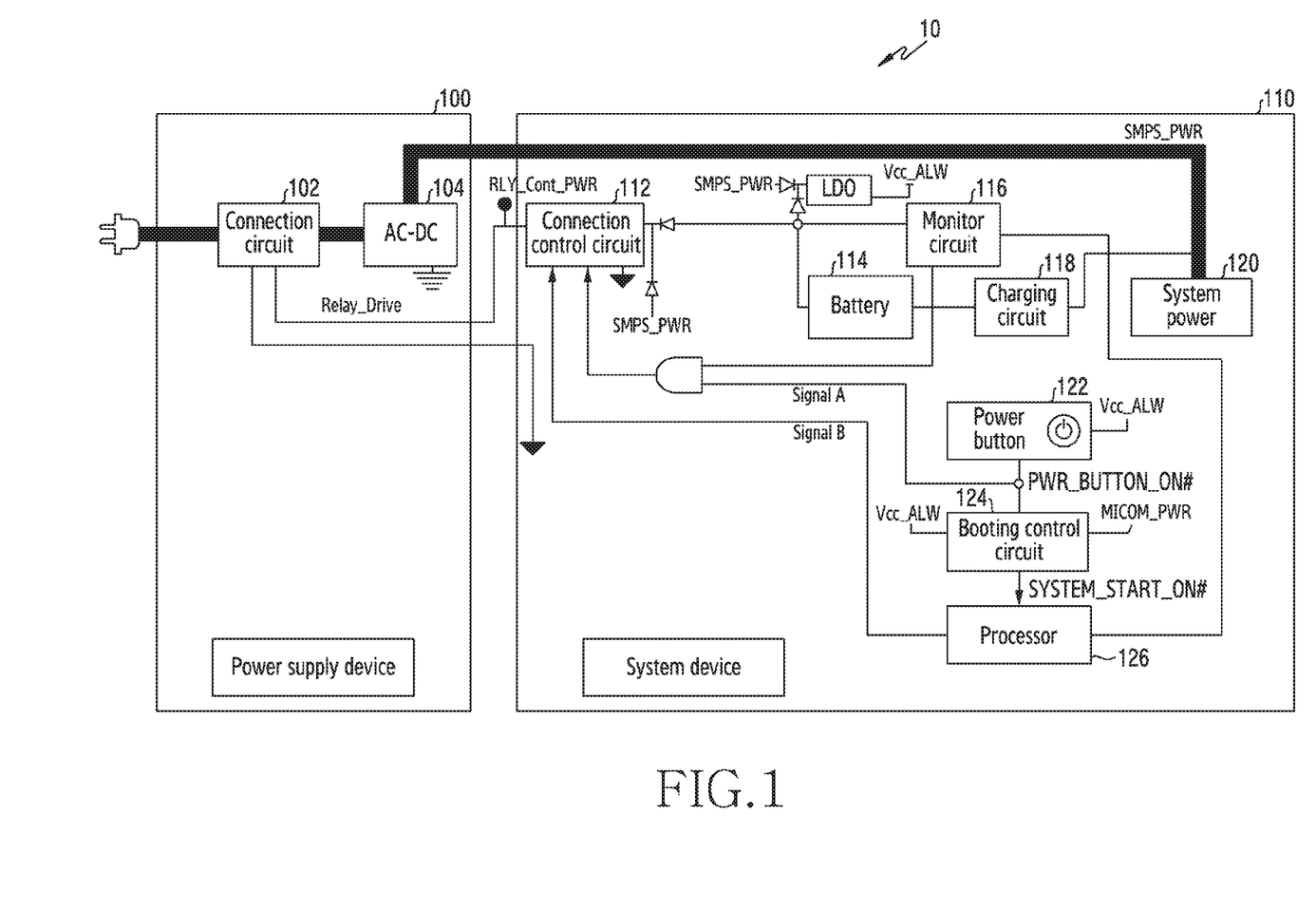
FIG. 1 is a block diagram illustrating an electronic device for reducing standby power according to various embodiments of the disclosure.

FIG. 1 is a block diagram illustrating an electronic device for reducing standby power according to various embodiments of the disclosure.

Referring to FIG. 1, the electronic device 10 may include a power supply device 100 and a system device 110.

According to one embodiment, the power supply device 100 may supply power to the system device 110 in order to drive the system device 110. For example, the power supply device 100 may include a connection circuit 102 and an AC/DC converter 104. In one example, the power supply device 100 may include a power supply, such as a switched-mode power supply (SMPS).

According to one embodiment, when the electronic device 10 operates in an active mode (e.g., S0 state), the power supply device 100 may be activated to supply power to the system device 110. For example, when the electronic device 10 operates in the active mode, the connection circuit 102 may connect an external power device and the AC/DC converter 104. The AC/DC converter 104 may convert alternating current (AC) power, supplied through the connection circuit 102, into direct current (DC) power.

According to one embodiment, when the electronic device operates in the standby mode (e.g., S5 state), the power supply device 100 may be deactivated to reduce the standby power of the electronic device 10. For example, when the electronic device 10 operates in the standby mode, the connection circuit 102 may block a connection between the external power device and the AC/DC converter 104. That is, the connection circuit 102 may block power supply to the AC/DC converter 104. In one example, the connection circuit 102 may include a relay circuit.

According to one embodiment, the system device 110 may control the operation of the electronic device 10. For example, the system device 110 may include a connection control circuit 112, a battery 114, a monitor circuit 116, a charging circuit 118, a system power interface 120, a power button 122, a booting control circuit 124, and a processor 126. In one example, the system device 110 may include a main board of a computer device.

According to one embodiment, the connection control circuit 112 may control the connection circuit 102 of the power supply device 100, based on the operating mode of the electronic device 10. For example, when the electronic device 10 is activated, the connection control circuit 112 may control the connection circuit 102 to be activated in order to activate the power supply device 100. In one example, when an input to the power button 112 is detected, the connection control circuit 112 may determine that the electronic device 10 is activated. For example, when the electronic device 10 is switched to the standby mode, the connection control circuit 112 may control the connection circuit 102 to be deactivated in order to restrict the operation of the power supply device 100. In one example, when receiving standby mode switch information from the processor 126, the connection control circuit 112 may determine that the operating mode of the electronic device 10 is switched to the standby mode.

According to one embodiment, the connection control circuit 112 may supply power (RLY_count_PWR_SRC) for driving the connection circuit 102 to the connection circuit 102. For example, the power for driving the connection circuit 102 may include power of the battery 104 or driving power of the system device 110 supplied from the power supply device 100 to the system device 110. In one example, when the electronic device 10 is switched from the standby mode to the active mode, the connection control circuit 112 may supply the power of the battery 114 to the connection circuit 102 so that the connection circuit 102 in an inactive state is activated. In one example, when the electronic device 10 operates in the active mode, the connection control circuit 112 may supply the driving power of the system device 110 to the connection circuit 102.

According to one embodiment, the battery 114 may be used to supply power to the power supply device 100 that is deactivated at a time when the electronic device 10 is switched from the standby mode to the active mode.

According to one embodiment, the monitor circuit 116 may check the remaining amount of the battery 114. For example, when the power supply device 100 is in an inactive state, the monitor circuit 116 may periodically check the voltage (e.g., the remaining amount) of the battery 114. When the voltage of the battery 114 is less than a reference voltage, the monitor circuit 116 may provide low-voltage state information to the connection control circuit 112.

According to one embodiment, the connection control circuit 112 may control the connection circuit 102 to be activated based on the voltage of the battery 114. For example, when the electronic device 10 operates in the standby mode, the connection circuit 102 may be deactivated based on control of the connection control circuit 112. When receiving the low-voltage state information from the monitor circuit 116 while the electronic device 10 is operating in the standby mode, the connection control circuit 112 may control the connection circuit 102 to be activated in order to charge the battery 114. When the connection circuit 102 of the power supply device 100 is activated and thus the power supply device 100 supplies the driving power of the system device 110, the charging circuit 118 may charge the battery 114 using the driving power of the system device 110.

According to one embodiment, the system power interface 120 may include an interface for receiving the driving power of the system device 110 from the power supply device 100. For example, the system device 110 may supply the driving power of the system device 110, received through the system power interface 120, to each component included in the system device 110.

According to one embodiment, the booting control circuit 124 may control the electronic device 10 operating in the standby mode to be switched to the active mode through one input to the power button 122. For example, when an input to the power button 122 is detected while the electronic device 10 is operating in the standby mode, the connection control circuit 112 may supply the power of the battery 114 to the connection circuit 102 so that the power supply device 100 is activated. The connection circuit 102 may be activated based on the power (e.g., the power of the battery 114) supplied through the connection control circuit 112 and may supply driving power to the system device 110. The booting control circuit 124 may delay an input signal of the power button 122 until the connection circuit 102 is activated to apply the driving power of the system device 110 and may then supply the input signal to the processor 126, thereby activating the system device 110 at the time of applying the driving power of the system device 110.

According to one embodiment, the processor 126 may control the electronic device 10 to provide various functions. For example, when the electronic device 10 is not used continuously for a reference period of time, the processor 126 may control the electronic device 10 to be switched to the standby mode in order to reduce power consumption by the electronic device 10. The processor 126 may transmit standby mode switch information of the electronic device 10 to the connection control circuit 112. In one example, the processor 126 may include a central processing unit (CPU) or a microcomputer (micom).

Figure 2:
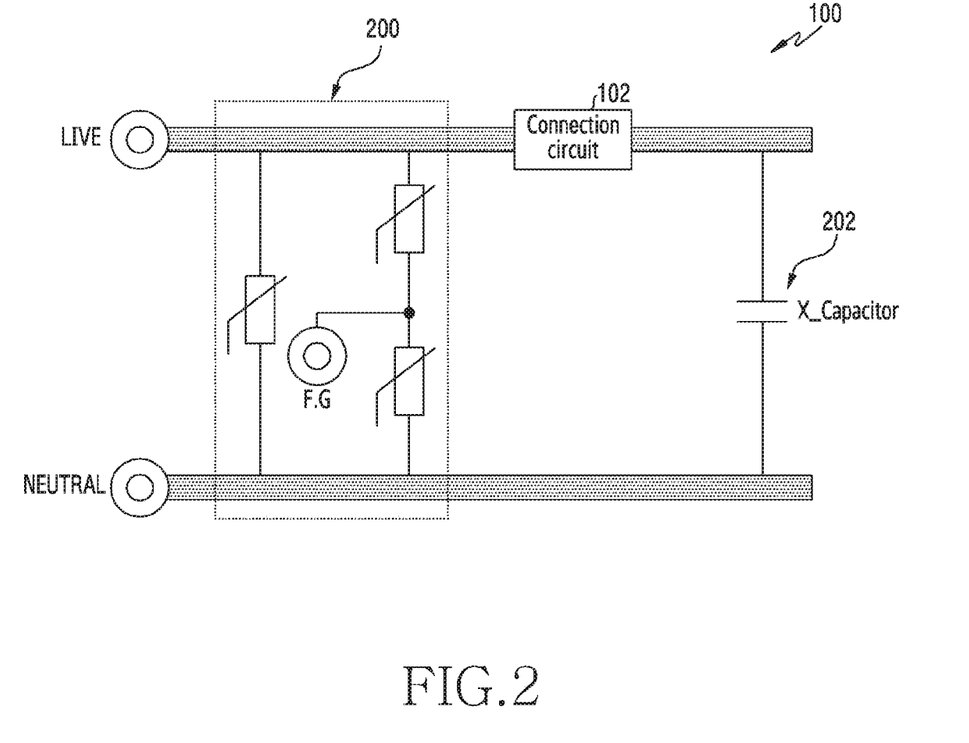
FIG. 2 illustrates the configuration of a power supply device according to various embodiments of the disclosure.

FIG. 2 illustrates the configuration of a power supply device according to various embodiments of the disclosure. In the following description, the position of the connection circuit 102 in the power supply device 100 is illustrated.

Referring to FIG. 2, the connection circuit 102 may be disposed at a front end of an X-capacitor 202, based on a leakage current by at least one component corresponding to AC power. For example, when the electronic device 10 operates in the standby mode, the connection circuit 102 may block power applied to the power supply device 100 from the front end of the X-capacitor 202, thereby preventing a current from leaking to the X-capacitor 202.

According to one embodiment, the connection circuit 102 may be disposed between a varistor 200 and the X-capacitor 202 in order to reduce loss of the connection circuit 102 by an external power device.

Figure 3A:
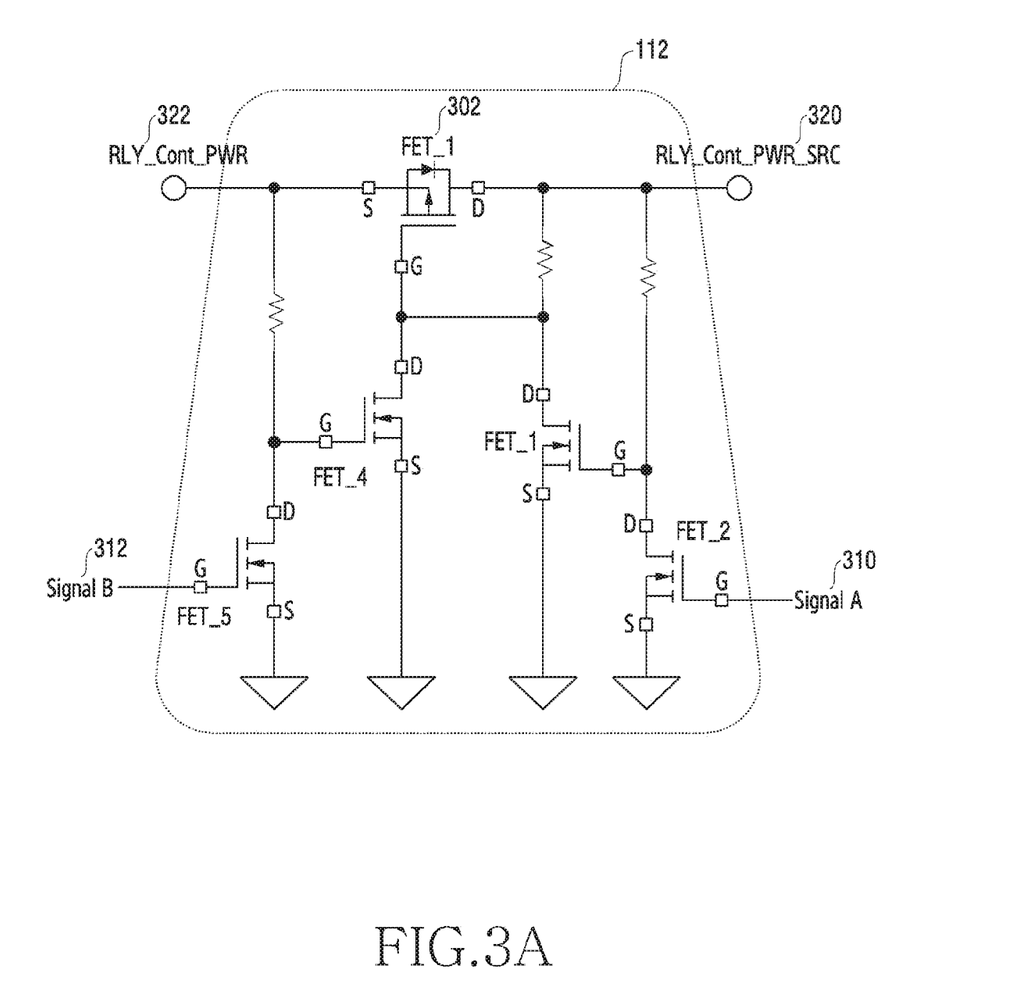
FIG. 3A and FIG. 3B illustrate the configuration of a connection control circuit according to various embodiments of the disclosure.
Figure 3B:
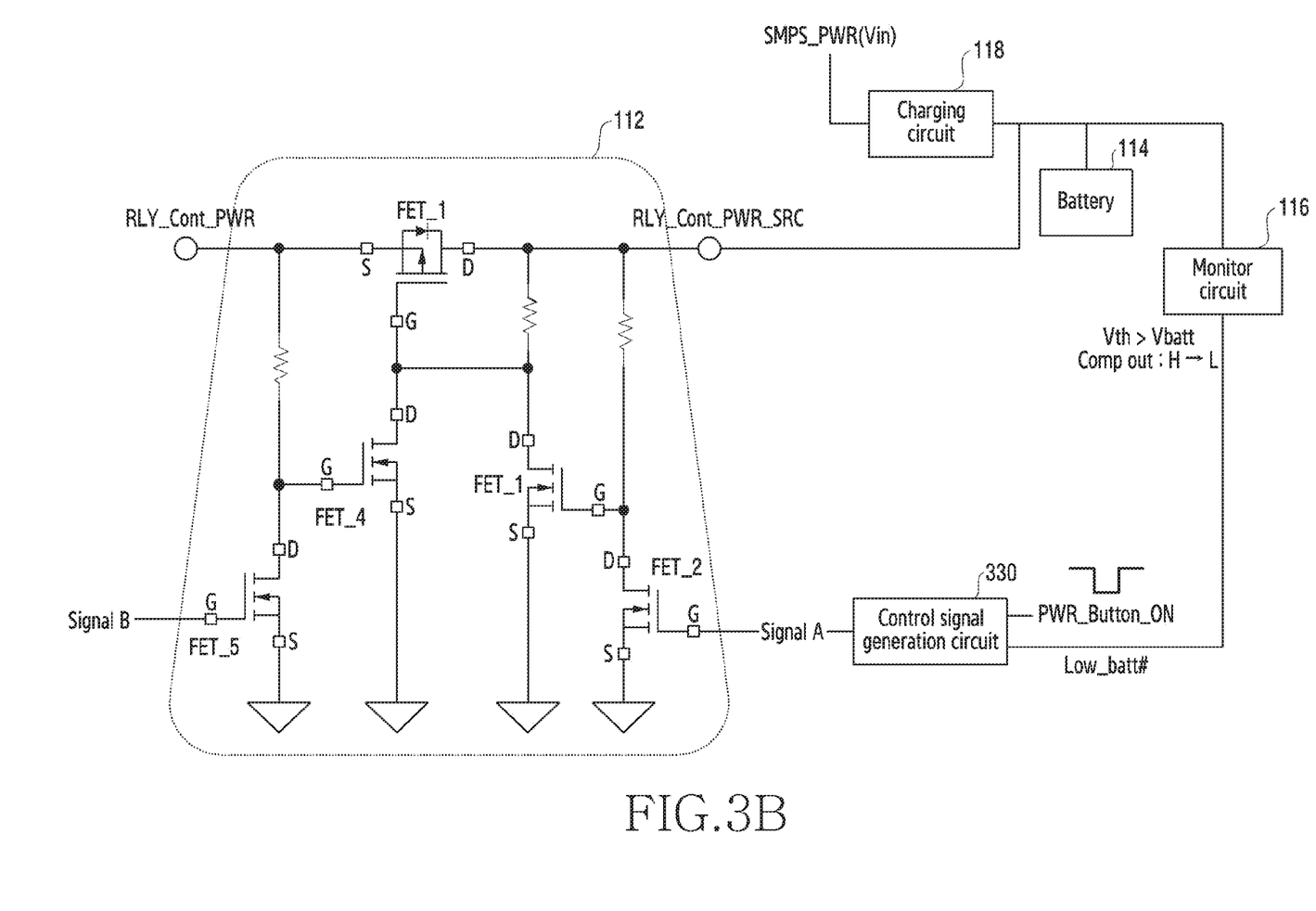

FIG. 3A and FIG. 3B illustrate the configuration of a connection control circuit according to various embodiments of the disclosure. In the following description, the detailed configuration of the connection control circuit 112 of FIG. 1 is illustrated.

Referring to FIG. 3A, the connection control circuit 112 may include a latch circuit to control supply of power for driving the connection circuit 102, based on a first control signal (signal A) 310 and a second control signal (signal B) 312. For example, the connection control circuit 112 may include a plurality of field-effect transistors (FETs). In one example, the first control signal 310 may be triggered (e.g., high→low) while an input to the power button 122 is detected. The second control signal 312 may be triggered (e.g., low→high) when the electronic device 10 is switched to the standby mode.

According to one embodiment, the connection control circuit 112 may activate (turn on) FET_1 302 when the first control signal 310 is triggered (high→low). For example, the connection control circuit 112 may activate FET_1 302 to connect paths 320 and 322 for supplying power to the connection circuit 102. In this case, the connection circuit 102 may be activated based on power (RLY-_count_PWR_SRC) 320 supplied through activated FET_1 302. That is, the connection control circuit 112 may activate FET_1 302, thus activating the power supply device 100.

According to one embodiment, the connection control circuit 112 may deactivate (turn off) FET_1 302 when the second control signal 312 is triggered (low→high). For example, the connection control circuit 112 may deactivate FET_1 302 to block the paths 320 and 322 for supplying power to the connection circuit 102. In this case, as power supply is blocked by deactivated FET_1 302, the connection circuit 102 may be deactivated. That is, the connection control circuit 112 may deactivate FET_1 302, thus deactivating the power supply device 100. In one example, FET_1 302 may maintain the active state until the second control signal 312 is triggered (low→high). Accordingly, the power supply device 100 (the connection circuit 102) may be activated from when the first control signal 310 is triggered to when the second control signal 312 is triggered.

According to one embodiment, as illustrated in FIG. 3B, the electronic device 10 may include the battery 114 for supplying power to the connection circuit 102. For example, when the power supply device 100 is activated, the connection circuit 102 may be driven using power supplied by the power supply device 100 to the system device 110. Accordingly, the battery 114 may supply power to the connection circuit 102 through the connection control circuit 112 when the power supply device 100 is deactivated.

According to one embodiment, when the electronic device 10 operates in the standby mode, the connection control circuit 112 may control the connection circuit 102 to be activated in order to charge the battery 114. For example, with the power supply device 100 deactivated, when the voltage of the battery 114 is the reference voltage or less, the monitor circuit 116 may provide low-voltage state information (e.g., a low signal) to a control signal generation circuit 330. The control signal generation circuit 330 may output the first control signal 310, based on input detection information (e.g., a low signal) of the power button 122 or the low-voltage state information (e.g., a low signal). For example, the first control signal 310 may be triggered when the control signal generation circuit 330 receives at least one of the input detection information of the power button 122 and the low-voltage state information. In one example, the control signal generation circuit 330 may be configured with at least one logic gate (e.g., an AND gate). In one example, the reference voltage may include a minimum voltage for driving the connection circuit 102.

According to one embodiment, when the first control signal 310 is triggered (high→low) based on the low-voltage state information, the connection control circuit 112 may activate FET_1 302 to supply the power of the battery 114 to the connection circuit 102. The power supply device 100 may convert AC power, supplied from the external power device, into DC power and may supply the DC power to the system device 110 (SMPS_PWR) due to activation of the connection circuit 102. The charging circuit 118 may supply power supplied from the power supply device 100 to the battery 114, thereby charging the battery 114.

According to one embodiment, when charging of the battery 114 has completed while the electronic device 10 is operating in the standby mode, the connection control circuit 112 may deactivate the power supply device 100. For example, when charging of the battery 114 has completed while the electronic device 10 is operating in the standby mode, the connection control circuit 112 may block power supply to the connection circuit 102 (e.g., FET 1=turn off). In one example, the connection control circuit 112 may check whether charging of the battery 114 has completed through the monitor circuit 116. When the voltage of the battery 114 exceeds a charging reference voltage, the monitor circuit 116 may determine that charging of the battery 114 has completed.

Figure 4:
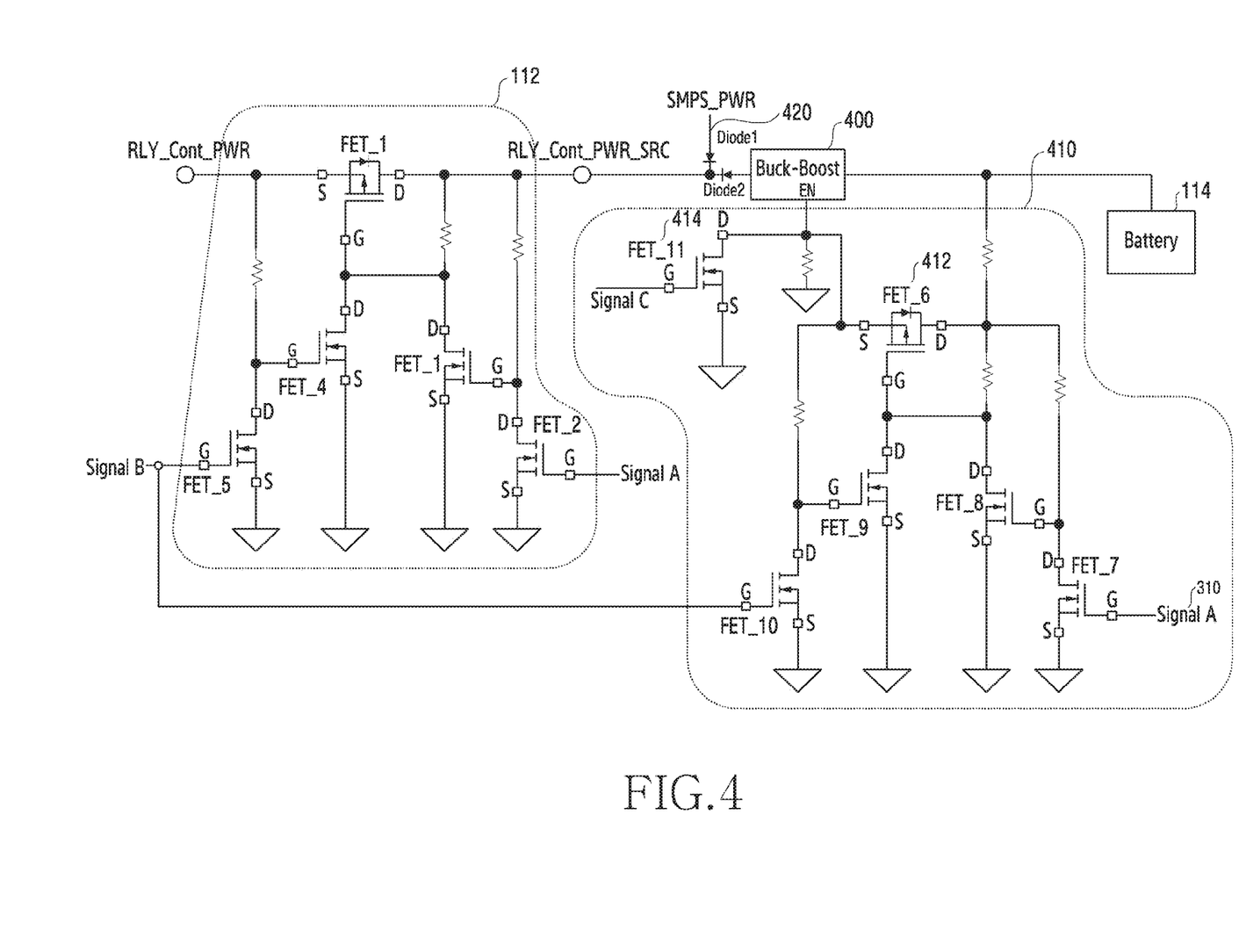
FIG. 4 illustrates the configuration of a connection circuit for power supply according to various embodiments of the disclosure.

FIG. 4 illustrates the configuration of a connection circuit for power supply according to various embodiments of the disclosure.

Referring to FIG. 4, the system device 110 may include a buck booster 400 for stable power supply to the connection circuit 102. For example, the buck booster 400 may be disposed between the battery 114 and the connection control circuit 112 e.g., FET_1 302).

According to one embodiment, the system device 110 may include a control circuit 410 to control an active state of the buck booster 400. For example, the control circuit 410 may include a circuit configuration to control the buck booster 400 for stable power supply to the connection circuit 102 and a circuit configuration to block an unnecessary discharge of the battery 114 when the electronic device 10 (or system device 110) is activated. In one example, the circuit configuration to control the buck booster 400 for stable power supply to the connection circuit 102 may include a latch circuit including a plurality of FETs.

According to one embodiment, when the first control signal 310 is triggered (high→low), the control circuit 410 may control the buck booster 400 to be activated by turning on FET_6 412. In one example, the buck booster 400 may boost the voltage of the battery 114 so that the power (RLY_count_PWR_SRC) 320 of the connection circuit 102 maintains a certain voltage level (e.g., 5V).

According to one embodiment, when the second control signal 312 is triggered (low→high), the control circuit 410 may control the buck booster 400 to be deactivated by turning off FET_6 412. In one example, FET_6 412 may maintain the active state until the second control signal 312 is triggered (low→high). Accordingly, the buck booster 400 may maintain the active state from when the first control signal 310 is triggered to when the second control signal 312 is triggered.

According to one embodiment, when the power supply device 100 is activated, the control circuit 410 may control the buck booster 400 to be deactivated by turning on FET_11 414. In one example, when the power supply device 100 is activated, the connection circuit 102 may be driven using power supplied from the power supply device 100 to the system device 110.

Accordingly, when the power supply device 100 is activated by the connection control circuit 112, the control circuit 410 may control the buck booster 400 to be switched to the inactive state by turning on FET_11 414.

According to various embodiments of the disclosure, the system device 110 may include a DC/DC converter having a buck-boost structure for stable power supply to the connection circuit 102.

Figure 5A:
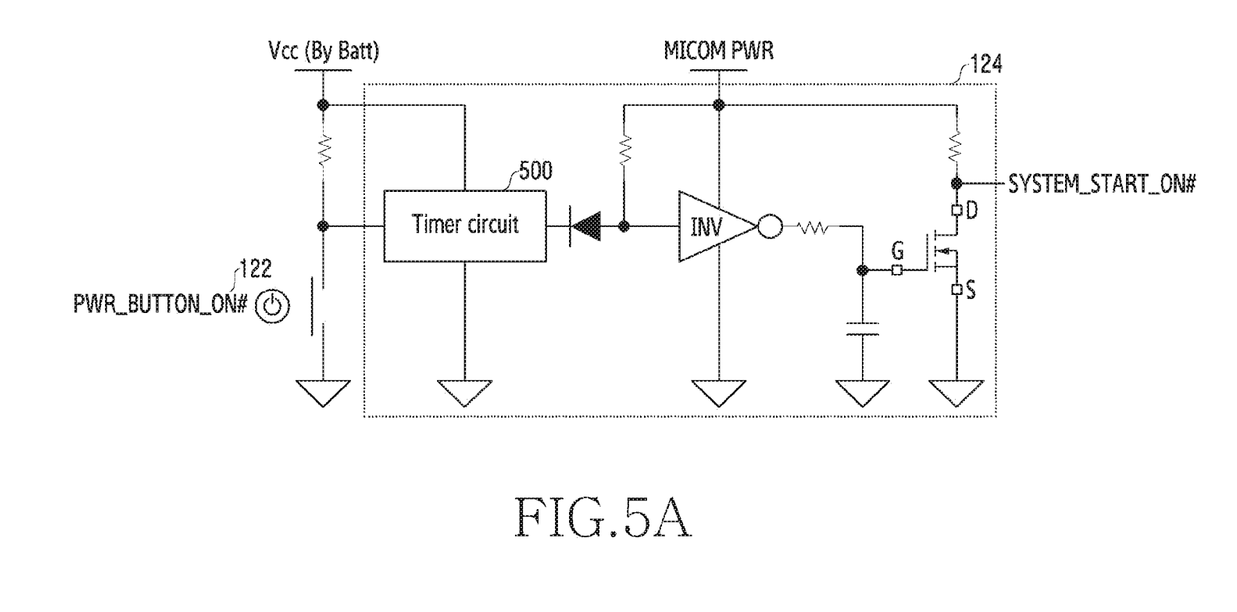
FIG. 5A and FIG. 5B illustrate the configuration of a booting control circuit according to various embodiments of the disclosure.
Figure 5B:
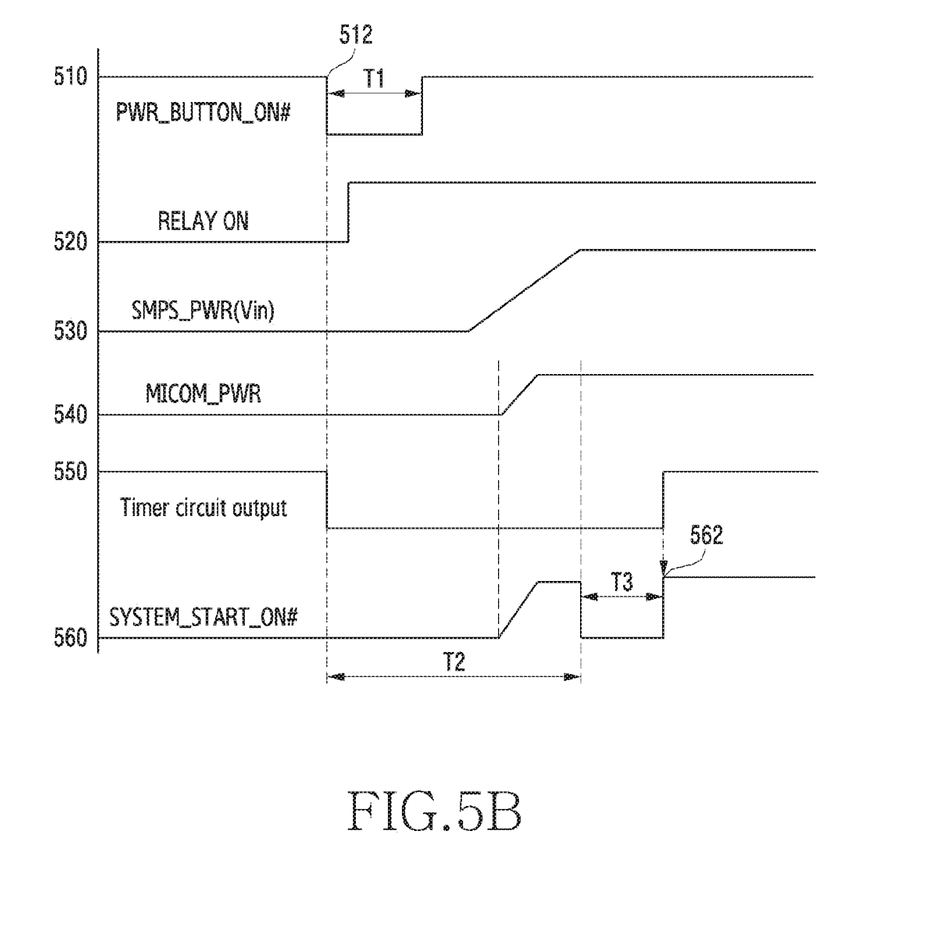

FIG. 5A and FIG. 5B illustrate the configuration of a booting control circuit according to various embodiments of the disclosure. In the following description, the detailed configuration of the booting control circuit 124 of FIG. 1 is illustrated.

Referring to FIG. 5A, the booting control circuit 124 may provide input information of the power button 122 as an initial input value for system booting. For example, when an input to the power button 122 is detected, the booting control circuit 124 may provide input detection information (low signal) of the power button 122 to the connection control circuit 112 in order to activate the power supply device 100. The booting control circuit 124 may delay the input detection information of the power button 122 using the delay circuit until the power supply device 100 is activated, and may then provide the input detection information to the processor 126. In one example, the delay circuit may include a timer circuit and an inverter.

According to one embodiment, as illustrated in FIG. 5B, an input 510 to the power button 122 may maintain a high state, may maintain a low state for a certain time after detecting an input (512) to the power button 122, and may then return to the high state. The connection control circuit 112 may supply power to the connection circuit 102 in order to activate the power supply 100 when the input 510 to the power button 122 transitions to the low state (520). When the connection circuit 102 is activated, the power supply device 100 may supply power to the system device 110 (530). The system power interface 120 may supply power supplied from the power supply device 100 to the processor 126, and accordingly the processor 126 may secure driving power (540).

According to one embodiment, as illustrated in FIG. 5B, the delay circuit may provide the input detection information (low-state information) of the power button 122 to the processor 126 at a time when the processor 126 secures the driving power. For example, the delay circuit may delay the input detection information (low-state information) of the power button 122 until the processor 126 secures the driving power. The delay circuit may output the input detection information (low-state information) of the power button 122 to the processor 126 through the inverter at a time 562 when the processor 126 secures the driving power, thereby performing system booting.

According to various embodiments of the disclosure, an electronic device may include: a power supply device configured to supply power for driving the electronic device; and a system device configured to be driven based on the power supplied from the power supply device, wherein the power supply device may include: an AC-DC converter configured to convert AC power, supplied from an external power device, into DC power; and a connection circuit configured to selectively connect the external power device and the AC-DC converter, based on an operating mode of the electronic device.

According to various embodiments, the power supply device may further include an overvoltage protection circuit configured to protect an internal circuit of the power supply device from the external power device, and the connection circuit may be disposed between the overvoltage protection circuit and a capacitor of the AC-DC converter.

According to various embodiments, the connection circuit may include a relay circuit.

According to various embodiments, the connection circuit may connect the external power device and the AC-DC converter when the electronic device is activated, and may disconnect the external power device and the AC-DC converter when the electronic device is switched to a standby mode.

According to various embodiments, the system device may include a connection control circuit configured to control a connection between the external power device and the AC-DC converter via the connection circuit and a battery configured to supply power to the connection circuit.

According to various embodiments, the connection control circuit may block power for driving the connection circuit when the electronic device is switched to a standby mode, and may supply the power of the battery to the connection circuit when the electronic device is activated.

According to various embodiments, the connection circuit may be driven based on the power of the battery when the electronic device is activated, and may be driven based on the power for driving the electronic device supplied from the power supply device when the power supply device is driven based on the power of the battery.

According to various embodiments, the electronic device may further include a buck booster configured to be disposed between the battery and the connection control circuit and to boost a voltage of the battery to a reference voltage.

According to various embodiments, the buck booster may be activated when the electronic device is activated, and may be deactivated when the power for driving the electronic device is supplied from the power supply device.

According to various embodiments, the connection control circuit may identify a voltage of the battery when the electronic device operates in a standby mode, and may supply the power of the battery to the connection circuit in order to charge the battery when a charging event occurs based on the voltage of the battery.

According to various embodiments, the connection control circuit may include a latch circuit.

According to various embodiments, the system device may further include a power button, a processor, and a booting control circuit, the connection control circuit may supply the power of the battery to the connection circuit when an input to the power button is detected while the electronic device is operating in a standby mode, and the booting control circuit may provide input detection information of the power button to the processor, based on a time when the connection circuit is activated and thus the power supply device supplies the power for driving the electronic device.

According to various embodiments, the booting control circuit may include a delay circuit configured to delay transmitting the input detection information of the power button until the time when the connection circuit is activated and thus the power supply device supplies the power for driving the electronic device.

According to various embodiments of the disclosure, an electronic device may include: a power supply device configured to supply power for driving the electronic device; and a system, device configured to be driven based on the power supplied from the power supply device, wherein: the power supply device may include an AC-DC converter configured to convert AC power, supplied from an external power device, into DC power and a connection circuit configured to block a connection between the external power device and the AC-DC converter when the electronic device operates in a standby mode; the system device may include a processor, a booting control circuit, a connection control circuit configured to control the connection between the external power device and the AC-DC converter via the connection circuit, and a battery configured to supply power to the connection circuit; the connection control circuit may supply the power of the battery to the connection circuit when an input to a power button is detected while the electronic device is operating in the standby mode; and the booting control circuit, may provide input detection information of the power button to the processor, based on a time when the connection circuit is activated and thus the power supply device supplies the power for driving the electronic device.

According to various embodiments, the power supply device may further include an overvoltage protection circuit configured to protect an internal circuit of the power supply device from the external power device, and the connection circuit may be disposed between the overvoltage protection circuit and a capacitor of the AC-DC converter.

According to various embodiments, the booting control circuit may include a delay circuit configured to delay transmitting the input detection information of the power button until the time when the connection circuit is activated and thus the power supply device supplies the power for driving the electronic device.

Figure 6:
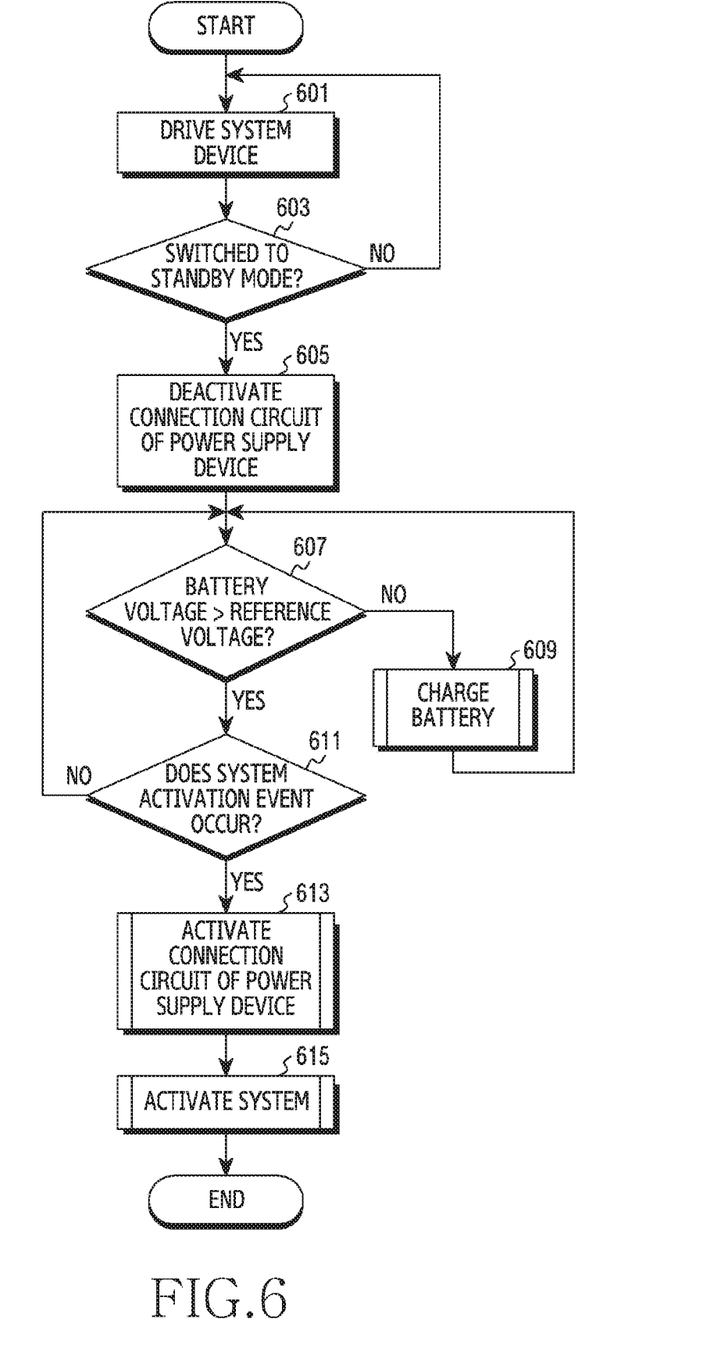
FIG. 6 is a flowchart for reducing power consumption in an electronic device in a standby mode according to various embodiments of the disclosure.

FIG. 6 is a flowchart for reducing power consumption in an electronic device in a standby mode according to various embodiments of the disclosure. In the following description, the electronic device may include the electronic device 10 of FIG. 1 or may at least partly include the electronic device 10.

Referring to FIG. 6, in operation 601, the electronic device may drive a system device. For example, the system device 110 may be driven based on power supplied from the power supply device 100. For example, the system power interface 120 may supply the power supplied from the power supply device 100 to each internal circuit (e.g., the processor 126).

In operation 603, the electronic device may check whether the electronic device is switched to the standby mode. For example, the processor 126 may identify that a standby mode switch event of the electronic device 10 occurs based on a user input. In one example, the standby mode switch event may occur based on an input to the power button 122 or the selection of a power-off icon.

In operation 605, when the electronic device is switched to the standby mode, the electronic device may deactivate the connection circuit 102 of the power supply device 100. For example, when receiving standby mode switch information from the processor 126, the connection control circuit 112 may block power supply to the connection circuit 102 of the power supply device 100 so that the connection circuit 102 is deactivated. The power supply device 100 may terminate driving as the connection circuit 102 is deactivated. In one example, when the second control signal 312 is triggered, the connection control circuit 112 may determine that the standby mode switch information is received from the processor 126. For example, when the second control signal 312 is triggered, the buck booster 400 may be deactivated based on control of the control circuit 410.

In operation 607, the electronic device may check whether the voltage of a battery exceeds a reference voltage. For example, the monitor circuit 116 may monitor the voltage of the battery 114 from a time when driving of the power supply device 100 is terminated, and may compare the voltage of the battery 114 with the reference voltage. In one example, the reference voltage may be set to a minimum voltage for driving the connection circuit 102.

In operation 609, when the voltage of the battery is the reference voltage or less, the electronic device may charge the battery by activating the power supply 100. For example, the battery 114 may be used as a power source for activating the deactivated connection circuit 102. Accordingly, when it is detected through the monitor circuit 116 that the voltage of the battery 114 is the reference voltage or less, the connection control circuit 112 may perform control to supply power to the connection circuit 102 in order to supply power for charging the battery 114. The charging circuit 118 may charge the battery 114 using the power supplied by the power supply device 100. In one example, when it is identified through the monitor circuit 116 that the battery 114 is completely charged, the connection control circuit 112 may block power supply to the connection circuit 102.

In operation 611, when the voltage of the battery exceeds the reference voltage, the electronic device may identify whether a system activation event occurs. For example, when an input to the power button 122 is detected, the connection control circuit 112 may determine that the system activation event has occurred. In one example, when the input 510 to the power button 122 transitions to the low state, the connection control circuit 112 may determine that the input to the power button 122 has been detected.

When a system activation event does not occur, the electronic device may determine whether the voltage of the battery exceeds the reference voltage in operation 607.

In operation 613, when the system activation event occurs, the electronic device may activate the connection circuit 102 of the power supply device 100. For example, when the input to the power button 122 is detected, the connection control circuit 112 may supply power of the battery 114 to the connection circuit 102 so that the connection circuit 102 is activated. The power supply device 100 may resume driving as the connection circuit 102 is activated. In one example, when the first control signal 310 is triggered, the connection control circuit 112 may determine that the system activation event has occurred. In one example, when the first control signal 310 is triggered, the buck booster 400 may be activated based on control of the control circuit 410.

In operation 615, the electronic device may activate a system of the electronic device, based on the power supplied from the power supply device 100. For example, the booting control circuit 124 may boot the system by providing input detection information of the power button 122 to the processor 126 until power is supplied to the processor 126.

Figure 7:
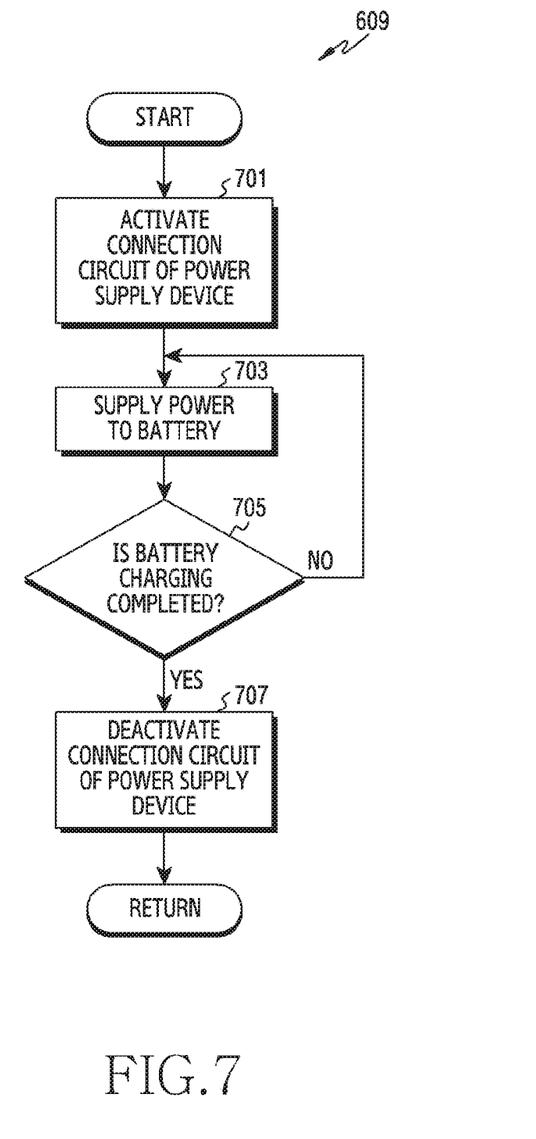
FIG. 7 is a flowchart for charging a battery to supply power to a power supply device in a standby mode according to various embodiments of the disclosure.

FIG. 7 is a flowchart for charging a battery to supply power to a power supply device in the standby mode according to various embodiments of the disclosure. In the following description, an operation of charging the battery in the standby mode of the electronic device 10 in operation 609 of FIG. 6 is illustrated. In the following description, the electronic device may include the electronic device 10 of FIG. 1 or may at least partly include the electronic device 10.

Referring to FIG. 7, in operation 701, when the voltage of the battery is the reference voltage or less in the standby mode of the electronic device (e.g., operation 607 of FIG. 6), the electronic device may activate the connection circuit of the power supply device in order to charge the battery. For example, when the voltage of the battery 114 is the reference voltage or less, the monitor circuit 116 may provide low-voltage state information to the connection control circuit 112. When receiving the low-voltage state information from the monitor circuit 116, the connection control circuit 112 may connect the paths 320 and 322 for supplying power to the connection circuit 102 by activating FET_1 302 of FIG. 3A. The connection circuit 102 may be activated based on power supplied through the connection control circuit 112. For example, when the first control signal 310 is triggered based on the low-voltage state information, the connection control circuit 112 may determine that a system activation event has occurred. In one example, when the first control signal 310 is triggered, the buck booster 400 may be activated based on control of the control circuit 410.

In operation 703, the electronic device may charge the battery using power supplied by the power supply device. For example, the charging circuit 118 may charge the battery 114 by supplying at least part of the driving power of the system device 110, supplied by the power supply device 100, to the battery 114.

In operation 705, the electronic device may check whether charging of the battery has completed. For example, the monitor circuit 116 may periodically monitor the voltage of the battery 114 while charging the battery 114. When the voltage of the battery 114 exceeds the charging reference voltage, the monitor circuit 116 may determine that charging of the battery has completed.

When charging of the battery has not completed, the electronic device may continuously charge the battery in operation 703.

In operation 707, when charging of the battery has completed, the electronic device may deactivate the connection circuit 102 of the power supply device 100. For example, when identifying charging completion state information of the battery 114 through the monitor circuit 116, the processor 126 may control the second control signal 312 of FIG. 3A to be triggered (e.g., low→high). When the second control signal 312 is triggered, the connection control circuit 112 may deactivate FET_1 302 of FIG. 3A to block power supply to the connection circuit 102. The connection circuit 102 may be deactivated as the power supply thereto is blocked by the connection control circuit 112.

According to various embodiments of the disclosure, when a system activation event occurs while charging the battery, the electronic device may activate the system device 110. For example, when an input to the power button 122 is detected before charging of the battery 114 has completed, the connection control circuit 112 may maintain power supply to the connection circuit 102 so that the connection circuit 102 remains activated. In one example, when an input to the power button 122 is detected while charging the battery 114 in operation 703, the electronic device may activate the system device in operation 615 of FIG. 6.

Figure 8:
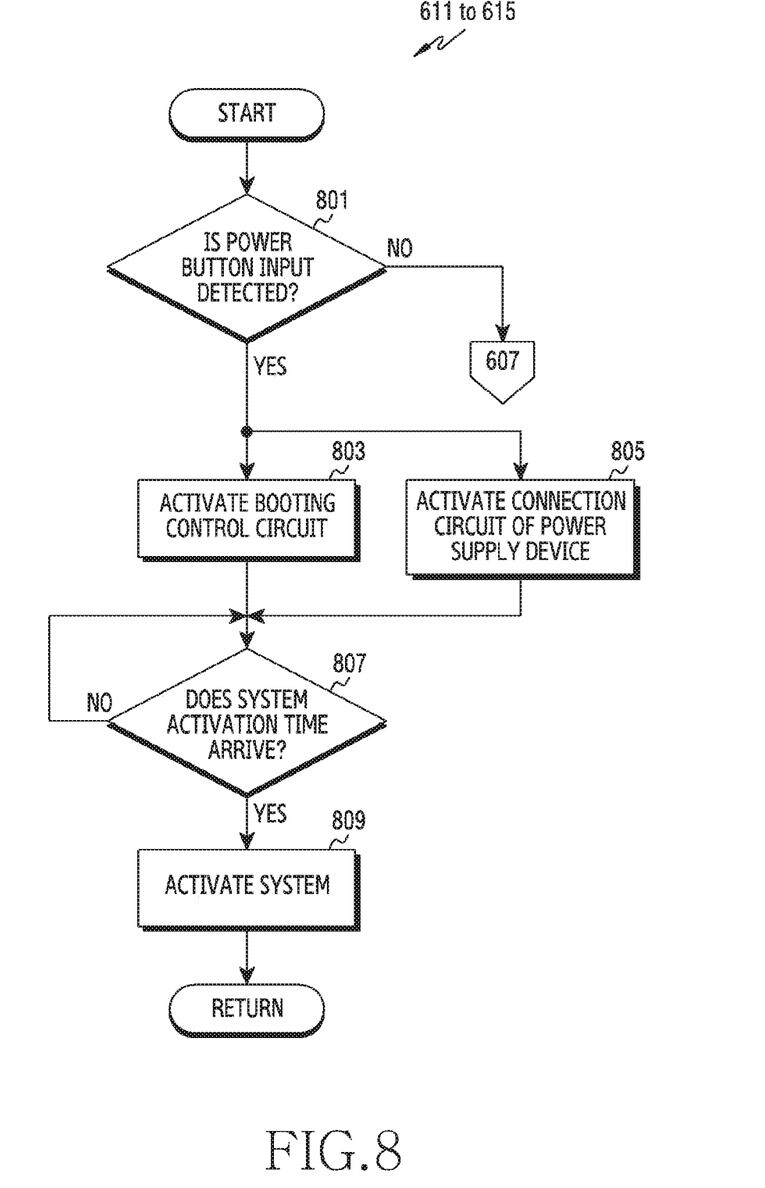
FIG. 8 is a flowchart for activating a system device according to various embodiments of the disclosure.

FIG. 8 is a flowchart for activating a system device according to various embodiments of the disclosure. In the following description, an operation of switching the operating mode of the electronic device 10 to the active mode in operation 611 to operation 615 of FIG. 6 is illustrated. In the following description, the electronic device may include the electronic device 10 of FIG. 1 or may at least partly include the electronic device 10.

Referring to FIG. 8, in operation 801, when the voltage of the battery exceeds the reference voltage in the standby mode of the electronic device (e.g., operation 607 of FIG. 6), the electronic device may identify whether an input to the power button is detected. For example, the power button 122 may output low-state information, based on an input by a user.

When the input to the power button is not detected, the electronic device may monitor the voltage of the battery. For example, in operation 607 of FIG. 6, the electronic device 10 may periodically check whether the voltage of the battery 114 exceeds the reference voltage through the monitor circuit 116.

In operation 803, when the input to the power button is detected, the electronic device may activate the booting control circuit. For example, when input information of the power button 122 transitions to a low state, the booting control circuit 124 may be activated to control driving of a system.

In operation 805, when the input to the power button is detected, the electronic device may activate the connection circuit 102 of the power supply device 100. For example, the first control signal 310 may be triggered when the input information of the power button 122 transitions to the low state (high→low). When the first control signal 310 is triggered based on the input information of the power button 122, the connection control circuit 112 may activate FET_1 302 of FIG. 3A to supply power to the connection circuit 102. For example, the power of the connection circuit 102 may include the power of the battery 114. When the first control signal 310 is triggered, the buck booster 400 may be activated to stably supply the power of the battery 114 to the connection circuit 102.

In operation 807, the electronic device may check whether a time to activate the system arrives. For example, the booting control circuit 124 may activate the power supply device 100 with a single input to the power button 122 and may delay input detection information of the power button 122 until a time when the power supply device 100 is activated to supply power to the processor 126 in order to start the system.

In operation 809, when the time to activate the system arrives, the electronic device may activate the system by providing the input detection information of the power button to the processor 126 through the booting control circuit 124. For example, the booting control circuit 124 may provide the input detection information of the power button 122 to the processor 126 at the time when the power supply 100 is activated to supply power to the processor 126. The processor 126 may boot the system, based on the input detection information of the power button 122.

According to various embodiments of the disclosure, an operating method of an electronic device may include: operating using power supplied from a power supply device of the electronic device; and deactivating a connection circuit configured to connect an external power device and an AC-DC converter in the power supply device when the electronic device is switched to a standby mode.

According to various embodiments, the connection circuit may be disposed between an overvoltage protection circuit, configured to protect an internal circuit of the power supply device from the external power device, and a capacitor of the AC-DC converter.

According to various embodiments, the connection circuit may include a relay circuit.

According to various embodiments, the method may further include: activating the connection circuit, based on power of a battery of the electronic device when the electronic device is activated; converting AC power of the external power device, supplied to the AC-DC converter through the activated connection circuit, into DC power using the AC-DC converter; and supplying the DC power to a system device of the electronic device.

According to various embodiments, the method may further include: activating the connection circuit, based on power of a battery when a charging event occurs while the electronic device is operating in the standby mode; converting AC power of the external power device, supplied to the AC-DC converter through the activated connection circuit, into DC power using the AC-DC converter; and charging the battery, based on at least part of the DC power.

According to various embodiments, the method may further include: activating the connection circuit, based on power of a battery of the electronic device when an input to a power button is detected while the electronic device is operating in the standby mode; converting AC power of the external power device, supplied to the AC-DC converter through the activated connection circuit, into DC power using the AC-DC converter; supplying the DC power to a system device of the electronic device; and providing input detection information of the power button to a processor of the system device when the DC power is supplied to the system device.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Various embodiments as set forth herein may be implemented as software (e.g., a program) including one or more instructions that are stored in a storage medium (e.g., internal memory or external memory) that is readable by a machine (e.g., a computer). For example, a processor of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Meanwhile, although various embodiments have been described, various modifications are possible without departing from the scope of the various embodiments. Therefore, the scope of various embodiments is not limited to the described embodiments, and should be determined not only by the scope of the claims to be described later, but also by the scope and equivalents of the claims.

The invention claimed is:
1. An electronic device comprising:
 a power supply device configured to supply power for driving the electronic device; and
 a system device configured to be driven based on the power supplied from the power supply device,
 wherein the power supply device comprises:
 an AC-DC converter configured to convert AC power, supplied from an external power device, into DC power; and
 a connection circuit configured to selectively connect the external power device and the AC-DC converter, based on an operating mode of the electronic device,
 wherein the system device comprises:
 a connection control circuit configured to control a connection between the external power device and the AC-DC converter via the connection circuit; and
 a battery configured to supply power to the connection circuit,
 wherein the connection control circuit is configured to block power for driving the connection circuit when the electronic device is switched to a standby mode and supply the power of the battery to the connection circuit when the electronic device is activated, and wherein the connection circuit is configured to be driven based on the power for driving the electronic device supplied from the power supply device when the power supply device is driven based on the power of the battery supplied in response to activation of the electronic device.

2. The electronic device as claimed in claim 1, wherein the power supply device is configured to further comprise an overvoltage protection circuit configured to protect an internal circuit of the power supply device from the external power device,
wherein the connection circuit is configured to be disposed between the overvoltage protection circuit and a capacitor of the AC-DC converter.

3. The electronic device as claimed in claim 1, wherein the connection circuit is configured to:
connect the external power device and the AC-DC converter when the electronic device is activated; and
disconnect the external power device and the AC-DC converter when the electronic device is switched to the standby mode.

4. The electronic device as claimed in claim 1, further comprising a buck booster configured to be disposed between the battery and the connection control circuit and to boost a voltage of the battery to a reference voltage.

5. The electronic device as claimed in claim 4, wherein the buck booster is configured to:
be activated when the electronic device is activated; and
be deactivated when the power for driving the electronic device is supplied from the power supply device.

6. The electronic device as claimed in claim 1, wherein the connection control circuit is configured to:
identify a voltage of the battery when the electronic device operates in the standby mode; and
supply the power of the battery to the connection circuit in order to charge the battery when a charging event occurs based on the voltage of the battery.

7. The electronic device as claimed in claim 1, wherein the system device further comprises:
a power button;
a processor; and
a booting control circuit,
wherein the connection control circuit is configured to supply the power of the battery to the connection circuit when an input to the power button is detected while the electronic device is operating in the standby mode,
wherein the booting control circuit is configured to provide input detection information of the power button to the processor, based on a time when the connection circuit is activated and thus the power supply device supplies the power for driving the electronic device.

8. The electronic device as claimed in claim 7, wherein the booting control circuit comprises a delay circuit configured to delay transmitting the input detection information of the power button until the time when the connection circuit is activated and thus the power supply device supplies the power for driving the electronic device.

9. The electronic device as claimed in claim 1, wherein the connection circuit is configured to include a relay circuit.

10. The electronic device as claimed in claim 1, wherein the connection control circuit is configured to include a latch circuit.

11. An operating method of an electronic device, the method comprising:
operating using power supplied from a power supply device of the electronic device;
deactivating a connection circuit configured to connect an external power device and an AC-DC converter in the power supply device when the electronic device is switched to a standby mode;
activating the connection circuit, based on power of a battery of the electronic device when an input to a power button is detected while the electronic device is operating in the standby mode;
converting AC power of the external power device, supplied to the AC-DC converter through the activated connection circuit, into DC power using the AC-DC converter;
supplying the DC power to a system device of the electronic device; and
providing input detection information of the power button to a processor of the system device when the DC power is supplied to the system device.

12. The method as claimed in claim 11, further comprising:
activating the connection circuit, based on power of a battery when a charging event occurs while the electronic device is operating in the standby mode;
converting AC power of the external power device, supplied to the AC-DC converter through the activated connection circuit, into DC power using the AC-DC converter; and
charging the battery, based on at least part of the DC power.

13. The method as claimed in claim 11, wherein the connection circuit is configured to be disposed between an overvoltage protection circuit, configured to protect an internal circuit of the power supply device from the external power device, and a capacitor of the AC-DC converter.

14. The method as claimed in claim 11, wherein the connection circuit is configured to include a relay circuit.

15. The method as claimed in claim 11, wherein the standby mode is configured to include a state in which driving of an operating system (OS) of an electronic device is terminated.

* * * * *